United States Patent [19]

Taguchi et al.

[11] Patent Number: 4,500,931
[45] Date of Patent: Feb. 19, 1985

[54] SIGNAL SAMPLING GATE CIRCUIT

[75] Inventors: Shinichiro Taguchi; Nobuya Nagao; Yutaka Ogihara, all of Fukaya, all of Japan

[73] Assignee: Tokyo Shibaura Denki Kabushiki Kaisha, Kawasaki, Japan

[21] Appl. No.: 560,159

[22] Filed: Dec. 12, 1983

Related U.S. Application Data

[62] Division of Ser. No. 238,024, Feb. 25, 1981, Pat. No. 4,433,255.

[51] Int. Cl.³ .............................................. H04N 9/493
[52] U.S. Cl. .................................... 358/310; 358/315; 358/316; 358/317
[58] Field of Search ............... 358/310, 315, 316, 317, 358/320, 327; 307/352, 353, 241, 242; 328/150, 151, 103, 152

[56] References Cited

U.S. PATENT DOCUMENTS

| | | | |
|---|---|---|---|
| 3,715,462 | 2/1973 | Krause | 178/5.4 CR |
| 3,792,195 | 2/1974 | Wilson et al. | 328/151 |
| 3,835,400 | 9/1974 | Briscoe | 328/151 |
| 4,066,919 | 1/1978 | Huntington | 307/353 |
| 4,232,302 | 11/1980 | Jagatioh | 328/151 |

FOREIGN PATENT DOCUMENTS

| | | |
|---|---|---|
| 2427591 | 1/1975 | Fed. Rep. of Germany . |
| 1422202 | 1/1976 | United Kingdom . |
| 1427891 | 3/1976 | United Kingdom . |
| 1479627 | 7/1977 | United Kingdom . |
| 2007929 | 5/1979 | United Kingdom . |
| 2030809 | 4/1980 | United Kingdom . |

Primary Examiner—Michael A. Masinick
Attorney, Agent, or Firm—Cushman, Darby & Cushman

[57] ABSTRACT

Signal sampling transistors, to which signals to be sampled are coupled under the control of a first gate signal, and which couples these signals to holds circuits according to the first gate signal, are provided. A switching circuit for differentially switching the signal sampling transistors to complementarily turn off one of these transistors is also provided. This switching circuit includes transistors, one of which is turned on while the other is turned off according to a second gate signal. The individual switching circuit transistors are connected to the respective sampling transistors. With this arrangement, of the sampling transistors one to which the "on" state one of the switching circuit transistors is connected is turned off while the other is turned on. Thus, the conduction state of the sampling transistors for coupling the aforementioned signals to be sampled to the hold circuits can be forcibly controlled by the second gate signal irrespective of the first gate signal.

8 Claims, 5 Drawing Figures

SIGNAL SAMPLING GATE CIRCUIT

This is a division of application Ser. No. 238,024, filed Feb. 25, 1981, now U.S. Pat. No. 4,433,255.

In a color video tape recorder for recording and reproducing color signal and luminance signal by the agency of a magnetic tape, the brightness signal and color signal are usually separately processed. In recording, the luminance signal (i.e., Y signal) is frequency modulated in a frequency deviation range of 3.5 to 4.8 MHz, while the color signal, which is at 3.58 MHz, is frequency converted to a low frequency signal at 688 kHz. Since the color signal is frequency converted to the low frequency signal for recording on magnetic tape, in playback what is called color noise is produced in the reproduced image on the receiver screen due to crosstalk between separate tracks. In order to remove this crosstalk in the color signal, it is in practice to record the color signal by inverting the phase for every horizontal scanning period (1 H) for a track (A track) of the magnetic tape while recording it in the consistent phase for another track (B track). In playback, the signal that has been recorded in the A track by inverting the phase for every 1 H is subjected to phase inversion for every 1 H to recover the original phase. The use of a plurality of heads in the recording and reproduction of signal with a color video tape recorder calls for various additional controls. For example, in the ACC circuit the color signal reproduced by A head in the playback mode and that reproduced by B head must be separately subjected to ACC detection voltage processing for the ACC action, that is, the ACC circuit must include separate ACC detection voltage processing circuits for the A and B heads respectively. This means that a plurality of hold circuits for holding ACC detection voltage signals to be sampled must be provided. Where hold circuits for holding ACC signals with respect to signals from A and B tracks, for instance, respectively, it is an important problem to correctly time the switching of these hold circuits to the switching of heads. Accordingly, a signal sampling gate circuit, which can selectively supply signals for sampling to a plurality of hold circuits under the control of a switching pulse signal, has been called for. Such a circuit is desired not only for the ACC action but also for precluding the malfunction of the color killer circuit.

The invention seeks to provide a circuit suitable for supplying signals to be sampled, obtained from a plurality of signal heads in the color VTR, to respective hold circuits, and particularly it has for its object to provide a signal sampling gate circuit, which is effective for suppressing sags occurring at the transient time of switching signals from respective heads one over to another, thereby preventing the malfunction of the circuit operated by the output signals of the hold circuits such as an ACC circuit and a color killer circuit.

Another object of the invention is to provide a signal sampling gate circuit, which comprises sampling transistors connected between a sampling signal generator circuit and the aforesaid hold circuits, signals generated from the sampling signal generator circuit being coupled through the sampling transistors to the hold circuits according to a first gate signal, and switching transistors connected to the respective sampling transistors and turned on by a second gate signal, and in which one of the sampling transistors connected to the "on" state one of the switching transistors held "on" by the second gate signal is adapted to be forcibly turned off irrespective of the first gate signal for alleviating the interference between the hold circuits.

A still further object of the invention is to provide a signal sampling gate circuit, which permits the use of a common ACC detector circuit for both recording and playback modes with such an arrangement that the frequency of the input to the ACC detector circuit is made the same in both the modes and that the output of the ACC detector circuit is held according to a head switch pulse.

A yet further object of the invention is to provide a signal sampling gate circuit, in which the output of the ACC detector circuit is distributed to hold circuits for respective heads according to a pulse for each track, and in recording the signal extracted from a hold circuit corresponding to one of the heads is supplied to ACC amplifier and also to color killer switch, that is, in which the color VTR ACC detector output is also utilized as a color killer signal.

This invention can be more fully understood from the following detailed description when taken in conjunction with the accompanying drawings, in which.

The invention appertains to a signal sampling gate circuit which is suited for the processing of color VTR signal where the ACC detection voltage in an ACC loop is switched for every track.

In the VTR system, usually one track of a magnetic tape is made available for the recording and reproduction of a signal for one field. For the transfer of signal to and from the magnetic tape, a plurality of magnetic heads are provided on a cylinder which is in frictional contact with the tape. This is done so for the purposes of improving the resolution of reproduction and the recording density on the magnetic tape. Typically, two or four recording heads are provided in this system. The invention will be described hereinunder in conjunction with a signal sampling gate circuit employed in a two-head color VTR.

In the color VTR having two heads (A and B heads), the A and B heads are each responsible to a signal for each field. For example, signal of odd fields is supplied to the A head, and signal of even fields to the B head. In this case, an ACC action for maintaining a constant level of the signals handled by the A and B heads is required. This essentially dictates the necessity of providing separate ACC actions for the signals of the respective odd and even tracks in the magnetic tape. In other words, independent ACC circuits have to be provided for the individual heads. In another aspect, at the time of switching of a hold circuit for holding the ACC detection voltage with respect to the A track and that for holding the ACC detection voltage with respect to the B track, transient signal sags are produced, which adversely affect not only the ACC action but also the color killer action.

The effectiveness of the signal sampling gate circuit according to the invention for solving the above problems in the color VTR and the useful effects that can be provided to the color VTR system itself by the incorporation of the circuit according to the invention will become more apparent from the following description.

Figure 1:
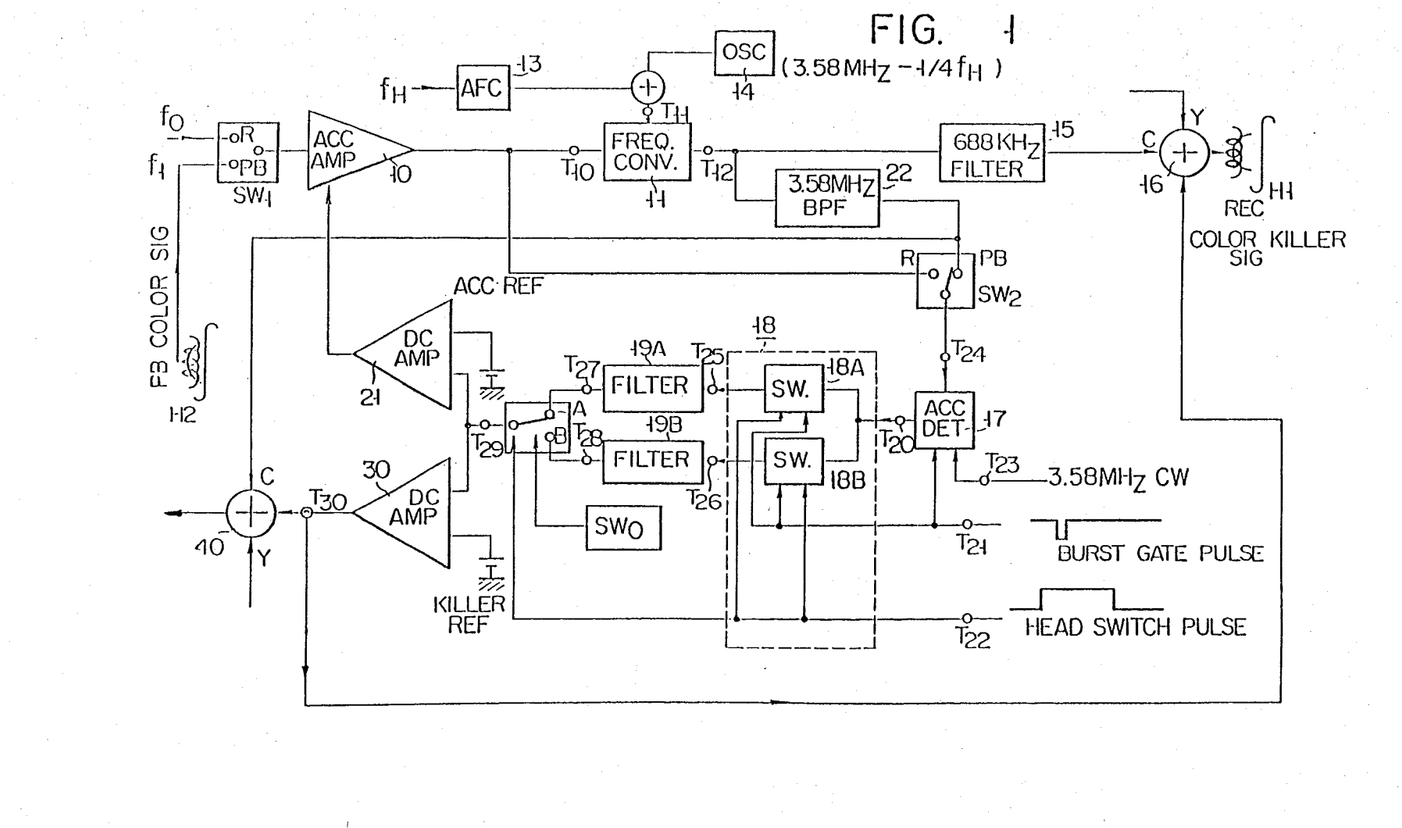
FIG. 1 is a schematic block diagram showing an embodiment of the signal sampling gate circuit according to the invention applied to a color video tape recorder.

FIG. 1 shows a block diagram of a color VTR incorporating the signal sampling gate circuit according to the invention.

With the signal sampling gate circuit according to the invention applied to the color VTR as shown in FIG. 1, it is possible to reduce malfunction of the ACC and a color killer which makes use of the ACC detection voltage, use a common ACC detector circuit for modes for the ACC action and color killer action in both recording and playback modes and provide the color killer action in a mixer circuit where luminance signal and color signal are mixed together.

Now, the embodiment of the signal sampling gate circuit according to the invention applied to the color VTR, shown in FIG. 1, will be described first in connection with the recording mode.

When the recording mode is set by a mode selection switch $SW_0$, mode selection switches $SW_1$ and $SW_2$ are both set to the side of a recording (R) terminal. In the recording mode, the signal to be recorded, at a frequency $f_0$ (of 3.58 MHz), is supplied to the R terminal side of the mode selection switch $SW_1$. Thus, the color signal to be recorded is fed to an ACC amplifier 10. The ACC amplifier 10 amplifies the color signal input to a predetermined level, and it provides as its output a color signal amplified to the predetermined level and at the frequency $f_0$. For recording the color signal on magnetic tape, its frequency conversion from the frequency $f_0$ (3.58 MHz) to a low frequency $f_1$ (688 kHz) is necessary. A low frequency converter 11 effects this low frequency conversion of the color signal for recording. The color signal at $f_0$ mentioned above is fed to a terminal $T_{10}$ of the frequency converter 11, and a signal at a frequency of 4.27 MHz ($=f_0+f_1$) is fed from a frequency converter 12 to another terminal $T_{11}$. The input to the terminal $T_{11}$, at the frequency $(f_0+f_1)$, is obtained as a signal at a frequency of $(44-\frac{1}{4})f_H$, appearing from an AFC circuit 13, and the output of an oscillator 14 which is oscillating at a peculiar frequency of $f_0=3.58$ MHz are additively combined in the frequency converter 12 mentioned above. Thus, in the recording mode the frequency converter 11, receiving the signal at $f_0$ at the terminal $T_{10}$ and the signal at $(f_0+f_1)$ at the terminal $T_{11}$, provides the low frequency converted signal output at $f_1$ (688 kHz). The low frequency conversion of the color signal to be recorded, is coupled from the frequency converter 11 through a filter 15 to a mixer 16, which combines the color signal (C) and brightness signal (Y) to be recorded. The level of the color signal fed to the mixer 16 is held constant by an ACC loop which is formed by an ACC detector 17 of a sync detection system, a signal sampling gate circuit 18 for coupling the ACC detector output to either hold circuit 19A or 19B, a head switch circuit 20, a DC amplifier 21 and the ACC amplifier 10 with the mode selection switch $SW_2$ set to the R terminal side.

As will be described hereinafter, to a playback (PB) terminal of the mode selection circuit $SW_2$ in the ACC loop a reproduced signal at 3.58 MHz is fed through the output terminal $T_{12}$ of the aforementioned frequency converter 11 and a 3.58 MHz band-pass filter (BPF) 22 at the time of the playback mode. The fact that the frequency of the output of the mode selection circuit $SW_2$, i.e., the input signal to the ACC detector circuit 17, is the same (3.58 MHz) at the time of the recording mode and at the time of the playback mode is very important. In the recording mode, while the color signal ($f_0=3.58$ MHz) is converted to low frequency signal, the ACC action is provided with respect to the 3.58 MHz signal. In the playback mode, while the low frequency signal at 688 MHz is fed to the ACC amplifier 10, the ACC action is again provided with respect to 3.58 MHz signal which is this time obtained through frequency conversion in the frequency converter 11. The fact that the same frequency is handled in the ACC loop at the time of both the recording and playback modes means that a single ACC detector circuit suffices for the ACC detection in both the modes. In other words, with the circuit construction as shown in FIG. 1, a single ACC detector circuit can be commonly used for both the recording and playback modes. The fact that the ACC circuit 17 can be operative in both the recording and playback modes is attributable to the use of a signal sampling gate circuit 18 according to the invention in the color VTR system shown in FIG. 1. Besides, the application of the signal sampling gate circuit according to the invention to a color VTR system does not permits the use of a common ACC detector circuit for both the recording and playback modes as mentioned previously, but also permits further useful effects to be obtained as will be discussed hereinunder.

The ACC detector circuit 17 mentioned above processes three different signals, namely color signal in the recording mode, signal reproduced by A head in the playback mode and signal reproduced by B head in the playback mode. In this connection, the circuit has to be constructed such that it is possible to identify which one of these three different signals the ACC detection voltage fed back to the ACC amplifier 10 appertains to in either recording or playback mode. The signal sampling gate circuit 18 according to the invention greatly contributes to the solution of this problem.

In the playback mode, with the mode selection switches $SW_1$ and $SW_2$ set to the playback mode side, the low frequency converted color signal at $f_1=688$ kHz is fed from a head $H_2$ which acts as a playback mode head through the mode selection switch $SW_1$ to the ACC amplifier 10. This low frequency converted color signal is frequency converted to the high frequency color signal at $f_0=3.58$ MHz before it is supplied to the ACC detector circuit 17. Thus, in the playback mode the frequency of the input signal to the ACC detector circuit 17 is 3.58 MHz as in the recording mode. The output of the ACC detector circuit 17 is coupled through a terminal $T_{20}$ to the signal sampling gate circuit 18, which is shown enclosed within a dashed rectangle in FIG. 1. The ACC detection signal from the ACC detector circuit 17 is coupled to the aforementioned terminal $T_{20}$ of the signal sampling gate circuit 18, and a burst gate pulse, which controls the detecting operation of the ACC detector circuit 17 and also the operation of the signal sampling gate circuit 18 receiving the signal from the ACC detector circuit 17, is coupled to a terminal $T_{21}$. Further, a head switch pulse, which is indicative of which one of the A and B heads is providing the signal being processed, is coupled to a terminal $T_{22}$. The result of the sync detection processing with a 3.58 MHz CW signal supplied through a terminal $T_{23}$ and the 3.58 MHz color signal supplied from the mode selection switch $SW_2$ is coupled to the terminal $T_{20}$ in synchronism to the aforementioned burst gate pulse. The ACC detection signal appearing at the terminal $T_{20}$ is selectively coupled through the signal sampling gate circuit 18 to either one of terminals $T_{25}$ and $T_{26}$ according to the head switch pulse signal coupled to the terminal $T_{22}$. The signal sampling gate circuit 18 is composed of sampling switch circuits 18A and 18B. The burst gate pulse signal from the terminal $T_{21}$ and head switch pulse signal from the terminal $T_{22}$ are supplied to both the sampling switch circuits 18A and 18B. The sampling switch circuits 18A and 18B function to transmit the detection signal from the ACC detector circuit 17 to respective hold circuits 19A and 19B. At this time, these circuits are alternately or complementarily rendered conductive in accordance with the aforementioned head switch pulse signal. During the period during which the head switch pulse signal indicates the A head, the ACC detection signal provided from the ACC detector circuit 17 during the pulse period of the burst gate pulse supplied through the terminal $T_{21}$ is coupled through the sampling switch circuit 18A to the hold circuit 19A, while during the period during which the head switch pulse signal indicates the B head it is coupled through the sampling switch circuit 18B to the hold circuit 19B. It is to be noted in the operation of the signal sampling gate circuit 18 that the conduction of either of the sampling switch circuits 18A and 18B is determined solely by the head switch pulse signal supplied to the terminal $T_{22}$.

Figure 2:
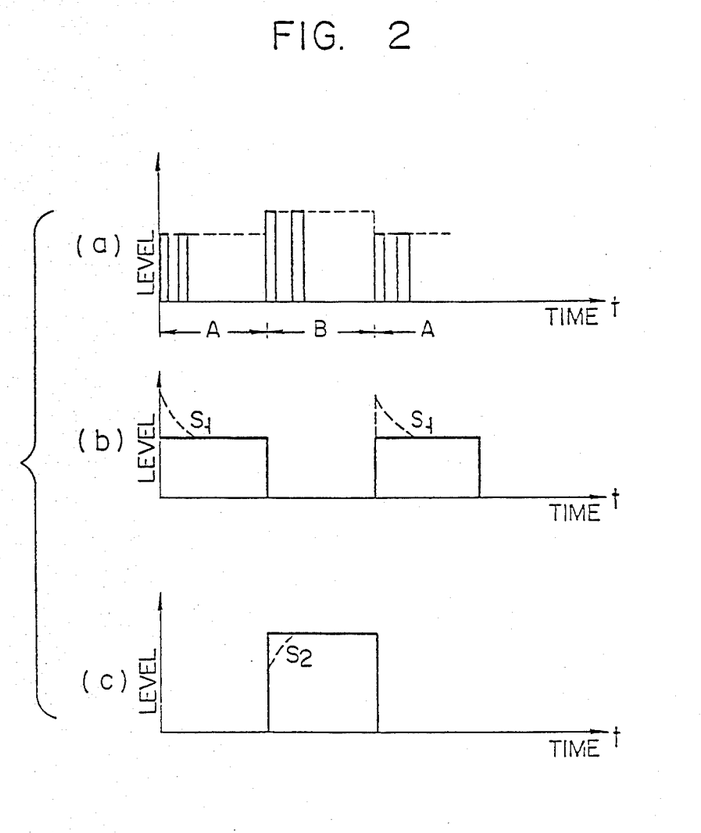
FIG. 2 is a waveform diagram showing sags occurring at the transient time of switching signals from respective heads one over to another.

This has an effect of suppressing signal sags $S_1$ and $S_2$, as shown by dashed lines in FIG. 2, that would otherwise result at the transient time of switching of the ACC detection signal with respect to the A head and that with respect to the B head. FIG. 2(a) shows the waveforms of the signal obtained at the output terminal $T_{20}$ of the ACC detector circuit 17 in FIG. 1, which shows an example of application of the signal sampling gate circuit according to the invention to a color VTR system, FIG. 2(b) shows the waveforms of a signal appearing at an output terminal $T_{27}$ of the hold circuit 19A which holds the ACC detection signal with respect to the A head, FIG. 2(c) shows the waveform of a signal at an output terminal $T_{28}$ of the hold circuit 19B which holds the ACC detection signal with respect to the B head. The signal sags $S_1$ and $S_2$ as shown in FIGS. 2(b) and 2(c) cause malfunction of the circuit. More particularly, in the case of the signal sag $S_1$ the ACC voltage is unnecessarily increased in the portion $S_1$ is increased, so that the gain of the color amplifier is excessively reduced by the ACC action. In the case of the signal sag $S_2$, the things are conversed, that is, the gain of the color amplifier is excessively increased by the ACC action. Also, malfunction of the color killer is caused. These malfunctions are caused by the signal sags $S_1$ and $S_2$ for every field to cause color irregularities in the reproduction from the color VTR, particularly on an upper portion thereof. This drawback can be overcome by the circuit shown in FIG. 1.

More particularly, the sags $S_1$ and $S_2$ shown in FIGS. 2(b), 2(c) would be caused if there is a time constant circuit between the ACC detector circuit on one hand and the hold circuits for holding the detection voltage for every field on the other hand. The system shown in FIG. 1, where the signal sampling gate circuit according to the invention is applied to a color VTR, is free from such a time constant circuit that would cause signal sags as mentioned, that is, it is free from any cause for the generation of sags of the signal to be held as the ACC signal. This is so because of the facts that in the system of FIG. 1 the frequency of the signal input to the ACC detector circuit 17 is 3.58 MHz either in the recording or playback mode and that the ACC detector circuit 17 itself is constructed for common use both in the recording and playback modes. In case of the frequency of the input signal to the detector circuit is $f_0 = 3.58$ MHz at the time of the playback mode and $f_1 = 688$ kHz at the time of the recording mode, although the ACC detector circuit may be commonly used for both the recording and playback modes, it would be necessary to provide time constant circuits for the detector circuit input frequency differ between the two modes. Otherwise, it would be necessary to provide separate ACC detector circuits for the recording and playback modes respectively. It is only when the requirements that the ACC detector circuit is commonly used for both the recording and playback modes and that the frequency of the input signal to the ACC detector circuit is the same in both the modes are met that it is needless to provide any time constant circuit would cause malfunctions of the ACC and color killer between the output terminal of the ACC detector circuits and the input terminal of the hold circuits.

With the signal sampling gate circuit 18 according to the invention applied to the color VTR system shown in FIG. 1, there is no need of providing any time constant circuit between the output terminal $T_{20}$ of the ACC detection circuit and the hold circuits 19A and 19B, so that sags with respect to the ACC detection signal, that would cause malfunctions of the ACC and color killer as described above, can be eliminated.

Thus, the arrangement that the ACC circuit 17 in FIG. 1 is commonly used for both the recording and playback modes and that the frequency of the signal input to the detector circuit 17 is made the same in both the modes does not only have the mere effect with regard to the circuit construction that the detector circuit is used for both the modes, but also has an effect with regard to the operation that the malfunctions of the ACC and color killer can be eliminated. With the ACC detector circuit input signal frequency made equal in both the recording and playback modes and with the provision of the signal sampling gate circuit 18 between the output terminal $T_{20}$ of the ACC detector circuit 17 which is constructed for common use for both the modes and the input terminals $T_{27}$ and $T_{28}$ of the hold circuits 19A and 19B, it is possible to eliminate sags that would otherwise occur on the signals held by the hold circuits 19A and 19B.

The hold signals obtained at the output terminals $T_{27}$ and $T_{28}$ of the hold circuits 19A and 19B are coupled to the head selection circuit 20 according to the head switch pulse signal supplied to the terminal $T_{22}$. In the playback mode, the head selection circuit 20 selectively and alternately couples the signals from the hold circuits 19A and 19B to a terminal $T_{29}$ according to the head switch pulse signal supplied to the terminal $T_{22}$. In the recording mode, the terminal $T_{29}$ of the head selection circuit 20 is held connected to either terminal A or B to receive the signal therefrom. At the time of the recording mode, the signal to be recorded is one obtained from an antenna or a coaxial cable, and at this time it is less likely that the heads should be switched.

The ACC voltage signal obtained at the terminal $T_{29}$ of the head selection circuit 20 is coupled through a DC amplifier 21 to the ACC amplifier 10 to control the gain thereof. It is also used as a color killer signal. More particularly, it is also coupled in the playback mode through a DC amplifier 30 which is a color killer signal amplifier to a mixer 40, in which a color signal (C) obtained from the aforementioned 3.58 MHz BPF 22 which converts the low frequency converted color signal at $f_1 = 688$ kHz to the high frequency color signal at $f_0 = 3.58$ MHz and luminance signal (Y) are combined. The mixer 40 has a color killer switch (not shown), and in playback it provides a color killer action according to the output voltage from the output terminal $T_{30}$ of the DC amplifier 30. The output terminal $T_{30}$ is also connected to the mixer 16 which is made operative in the playback mode. In the recording mode, the low frequency converted color signal at $f_1$ from the filter 15 and the luminance signal are mixed in the mixer 16 which is operative in this mode, and the output of the mixer is recorded on the magnetic tap via a recording head $H_1$. The mixer 16 for the recording mode has a color killer switch (not shown), and the voltage signal from the output terminal $T_{30}$ of the DC amplifier 30 to which the aforementioned ACC voltage signal is coupled is utilized as the color killer signal. In other words, the ACC signal obtained at the terminal $T_{29}$ mentioned above is utilized as the color killer signal in both the recording and playback modes. It is to be noted at this time that the color killer action in the recording and playback modes is provided by the respective mixers 16 and 40. To provide the color killer action by the mixer 40 particularly at the time of the playback has a significance. In playback, the low frequency converted color signal at $f_1 = 688$ kHz that has been produced at the time of recording is reconverted to the original high frequency of $f_0 = 3.58$ MHz. This high frequency color signal at $f_0$ is introduced to other circuits than its own signal path through the floating capacitance between circuit elements. If it is introduced into the mixer, undesired foreign colors appear on the reproduction of the screen even if color killer action is provided in the color killer stage. Such malfunction of the color killer can be eliminated by providing the color killer action in the mixer 40 as shown in FIG. 1.

Figure 3A:
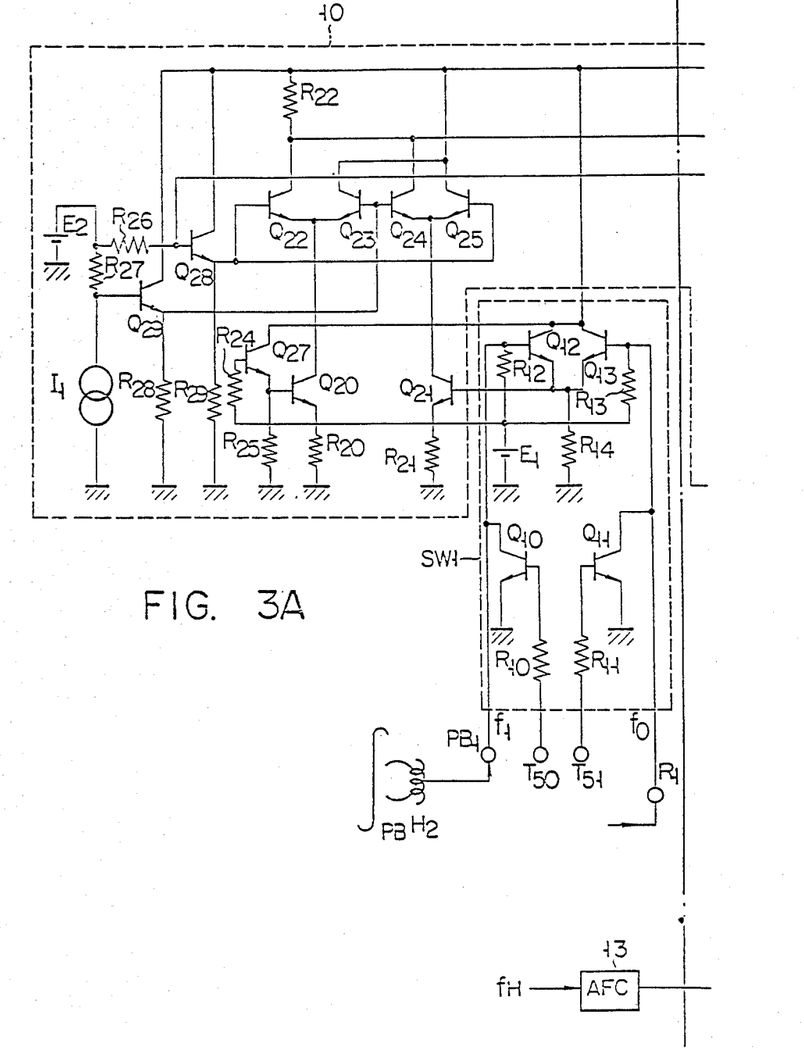
FIG. 3 is a circuit connection diagram showing a specific circuit construction of the signal sampling gate circuit according to the invention applied to a color video tape recorder.
Figure 3B:
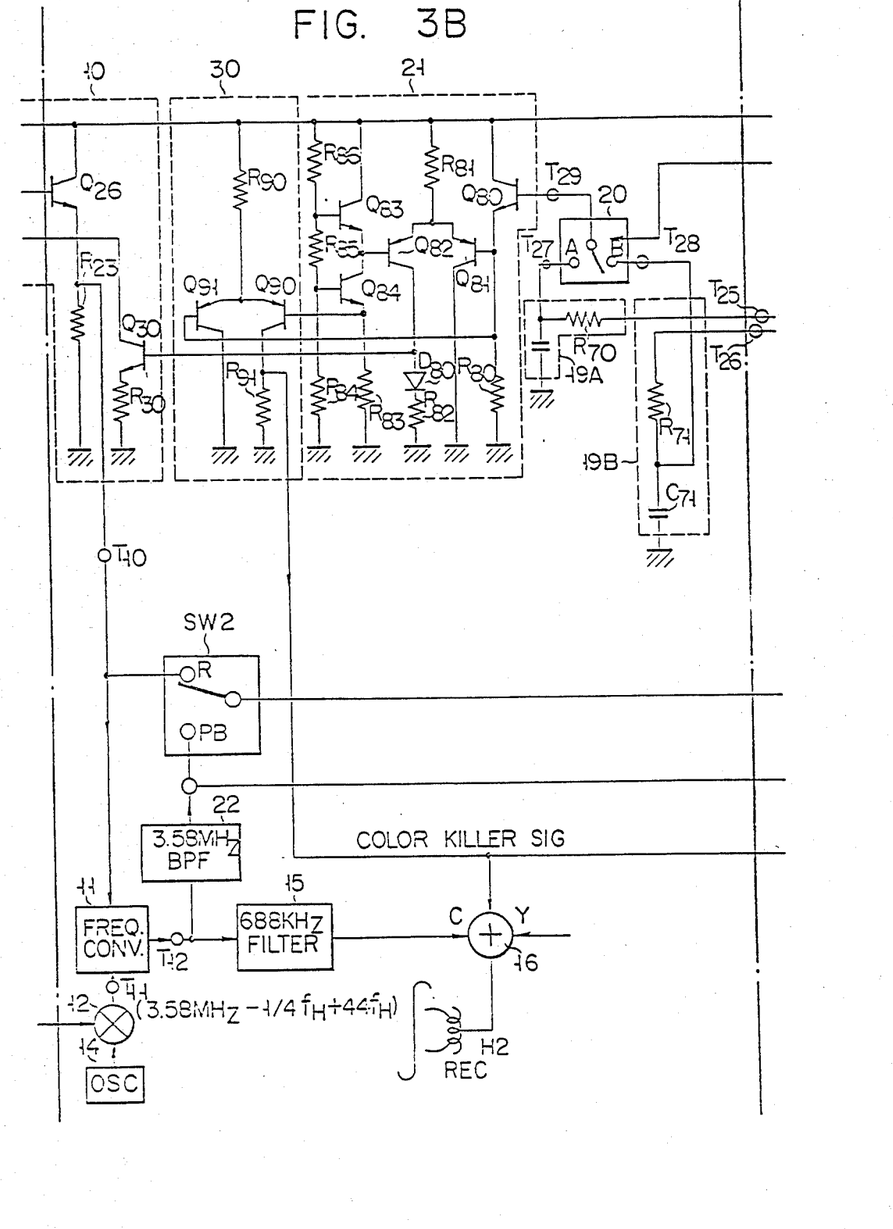
Figure 3C:
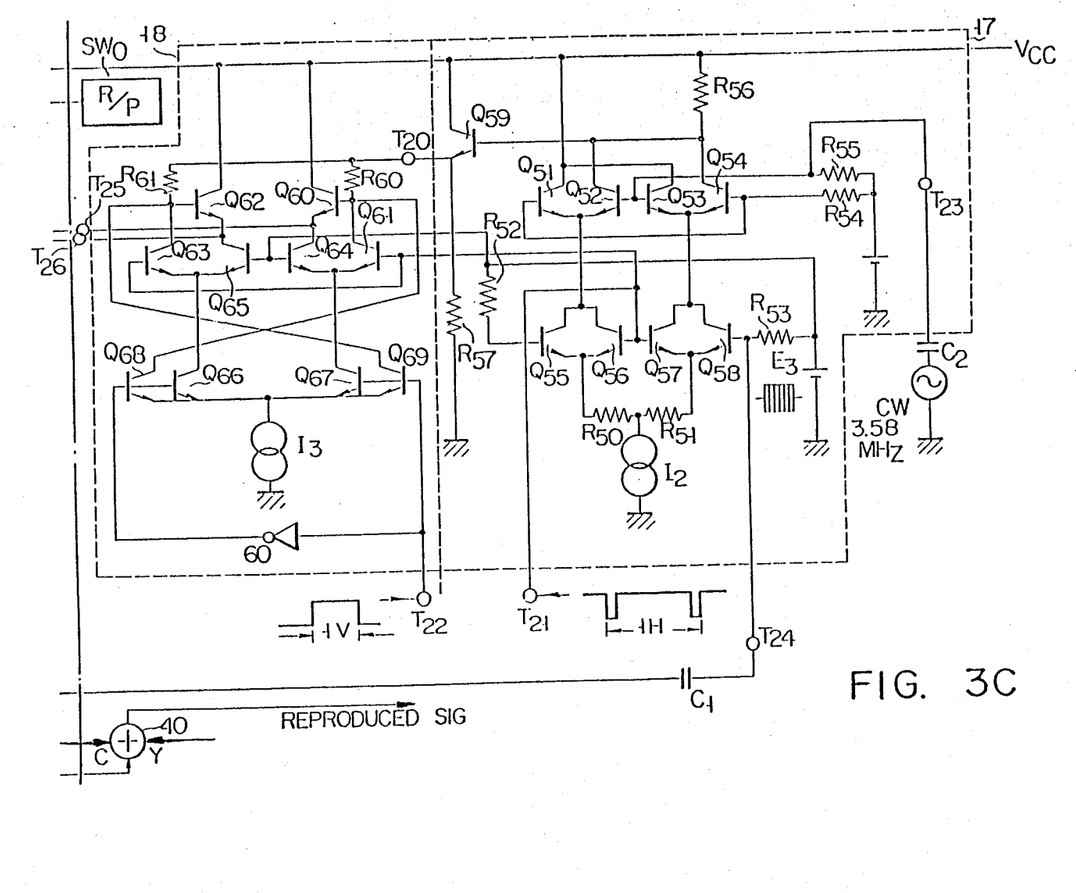

FIG. 3 shows a circuit diagram of an example of the circuit construction where the signal sampling gate circuit according to the invention is applied to a color VTR. In FIGS. 1 and 3, like parts are designated by like reference numerals.

Referring now to FIG. 3, the mode selection switch circuit $SW_1$ selectively couples the high frequency color signal $f_0$ from a terminal $R_1$ and the low frequency converted color signal $f_1$ from a terminal $PB_1$ to the ACC amplifier 10. Mode selection control signals are coupled through resistors $R_{10}$ and $R_{11}$ to transistors $Q_{10}$ and $Q_{11}$ respectively. For the recording mode, the terminals $T_{50}$ and $T_{51}$ are rendered to a low level and a high level respectively by the control signals. At this time, the transistor $Q_{10}$ is turned on, and the transistor $Q_{11}$ is turned off. The potential on the terminal $PB_1$ is thus brought to the ground potential, and only the signal from the terminal $R_1$ is impressed upon the base of a transistor $Q_{12}$ to turn on the transistor $Q_{12}$, whereby the signal $f_0$ is supplied to the ACC amplifier 10. For the playback mode, the transistor $Q_{10}$ is turned off while the transistor $Q_{11}$ is turned on by the control signals at the terminals $T_{50}$ and $T_{51}$. Thus, the terminal $R_{51}$ is thus brought to the grond potential, and the signal $f_1$ from the terminal $PB_1$ is supplied through a transistor $Q_{13}$ to the ACC amplifier 10. The bases of the transistors $Q_{12}$ and $Q_{13}$ are biased from a voltage source $E_1$ through respective resistors $R_{12}$ and $R_{13}$. A resistor $R_{14}$ is provided for permitting the signal impressed upon either transistor $Q_{12}$ or $Q_{13}$ as an emitter follower output to the ACC amplifier 10.

The gain of the ACC amplifier 10 is controlled by the signal selected by the mode selection switch circuit $SW_1$. The AC amplifier 10 is constructed as a differential amplifier with transistors $Q_{20}$ to $Q_{25}$ and resistors $R_{20}$ to $R_{22}$. The signal obtained from the load resistor $R_{22}$ is output through the emitter of a transistor $Q_{26}$ with the emitter connected to a resistor $R_{23}$ as an emitter-follower output to the frequency converter 11 and switch $SW_2$. The signal from the mode selection switch circuit $SW_1$ is applied as a change of the terminal voltage across the resistor $R_{14}$ to the base of a transistor $Q_{21}$ as a current source for the aforementioned differential amplifier. Another current source is constituted by a transistor $Q_{20}$, and a circuit formed by a transistor $Q_{27}$ connected to the base of the transistor $Q_{20}$ and resistors $R_{24}$, $R_{25}$ and $R_{20}$ becomes symmetrical with the circuit formed by the first-mentioned current source transistor $Q_{21}$ and resistor $R_{21}$ when either one of the transistors $Q_{12}$ and $Q_{13}$ in the mode selection switch circuit $SW_1$ is turned on. In this arrangement, by making the opposing resistances equal, extreme DC stability and practical immunity to the influence of temperature changes can be obtained. The differential amplifier mentioned above is given its bias voltage by a circuit formed by voltage source $E_2$, a current source $I_1$, resistors $R_{26}$ to $R_{29}$ and transistors $Q_{28}$ and $Q_{29}$. The emitter voltage on a transistor $Q_{29}$ is impressed as bias upon the common base juncture of the transistors $Q_{23}$ and $Q_{24}$ of the differential amplifier, and the emitter voltage on a transistor $Q_{28}$ is impressed as bias upon the common base juncture between the transistors $Q_{23}$ and $Q_{24}$. The transistors $Q_{28}$ and $Q_{29}$ in the bias circuits are connected as respective emitter follower in order that the differential amplifier will not be influenced by the impedance changes on the side of the voltage supply $E_2$. The bias circuits for the differential amplifiers, i.e., the bias circuit for the transistor $Q_{28}$ and that for the transistor $Q_{29}$, are also constructed as symmetrical circuits to each other for eliminating the influence of temperature changes upon the differential amplifier. The constant current source $I_1$ is provided to promote the symmetry of the circuits. The gain of the differential amplifier which functions as the ACC amplifier is controlled by the relative potentials on the base of the transistors $Q_{23}$ and $Q_{24}$ and on the base of the transistors $Q_{22}$ and $Q_{25}$. This gain control voltage is obtained by controlling the base side impedance of the transistor $Q_{28}$ by a circuit formed by a transistor $Q_{30}$ connected to the base of the transistor $Q_{29}$ and a resistor $R_{30}$. In other words, the gain of the ACC amplifier is determined according to the ACC voltage applied to the base of the transistor $Q_{30}$. The transistor $Q_{30}$ is necessary for providing the ACC action, and it is connected to the base side of the transistor $Q_{28}$. With the aforementioned constant current source $I_1$ connected to this transistor, the symmetry of the bias circuits for the differential amplifier is enhanced, that is, the differential amplifier is made less susceptible to temperature changes.

The signal appearing at the output terminal $T_{10}$ of the ACC amplifier 10 is supplied to the frequency converter 11 and also to the mode selection switch $SW_2$.

When the mode selection switch $SW_2$ is set to the recording mode side, the color signal at $f_0 = 3.58$ MHz to be recorded is supplied from the R terminal of the switch through a capacitor $C_1$ to the ACC detector circuit 17. In the playback mode, the color signal at $f_1=688$ kHz is converted through the frequency converter circuit 11 to the high frequency signal at $f_0=3.58$ MHz which is supplied through the capacitor $C_1$ to the ACC detector circuit 17.

The ACC detector circuit 17 includes a dually balanced differential amplifier having transistors $Q_{51}$ to $Q_{58}$, resistors $R_{50}$, $R_{51}$ and $R_{56}$ and a current source $I_2$, a bias circuit for biasing this differential amplifier and having voltage sources $E_3$ and $E_4$ and resistors $R_{53}$ to $R_{55}$, and an output circuit having a transistor $Q_{59}$ and a resistor $R_{57}$. In the ACC detector circuit 17 of this construction, the sync detection of the 3.58 MHz CW signal coupled through a capacitor $C_2$ to the terminal $T_{23}$ and the 3.58 MHz recording or playback mode color signal coupled from the output terminal of the mode selection switch $SW_2$ through the capacitor $C_1$ is effected by the aforementioned dually balanced differential amplifier in accordance with the burst gate pulse supplied to the terminal $T_{21}$. The detection output is coupled through an emitter-follower transistor $Q_{59}$ to the signal sampling gate circuit 18.

To the signal sampling gate circuit 18, are coupled the burst gate pulse from the terminal $T_{21}$ and the head switch pulse from the terminal $T_{22}$. The signal sampling gate circuit has a gate function to couple the output of the ACC detector circuit 17 to the hold circuits 19A and 19B according to the head switch pulse signal, and according to the invention it is featured that this gating function depends solely upon the head switch pulse.

The signal sampling gate circuit 18 has a construction as described in detail hereinunder. The emitter of the output transistor $Q_{59}$ in the ACC detector circuit 17 is connected through a resistor $R_{60}$ to the base of a transistor $Q_{60}$ and is also connected through a resistor $R_{61}$ to the base of a transistor $Q_{62}$ and also to the collector of a transistor $Q_{63}$. Transistors $Q_{64}$ and $Q_{65}$ are connected to the emitter of the respective transistors $Q_{60}$ and $Q_{62}$. The transistors $Q_{63}$ and $Q_{65}$ are connected as a differential pair, and their common emitter juncture is connected through a transistor $Q_{66}$ to a constant current source $I_3$. Likewise, the transistors $Q_{61}$ and $Q_{64}$ are also connected as a differential pair, and their common emitter juncture is connected through a transistor $Q_{67}$ to a constant current source $I_3$. The base of the transistor $Q_{66}$ is connected to the base of the transistor $Q_{68}$, which has its collector connected to the base of the transistor $Q_{60}$. The base of the transistor $Q_{67}$ is connected to the collector of the transistor $Q_{69}$, which has its collector connected to the base of the transistor $Q_{62}$. The terminal $T_{22}$, to which the head switch pulse is supplied, is connected to the base of the transistor $Q_{69}$, is also connected through an inverter 60 to the base of the transistor $Q_{68}$. Thus, the head switch pulses supplied to the base of the transistor $Q_{68}$ and that supplied to the base of the transistor $Q_{69}$ have opposite polarities. Of the output terminals $T_{25}$ and $T_{26}$ of the signal sampling gate circuit, the terminal $T_{25}$ is connected to the hold circuit 19A which includes a resistor $R_{70}$ and a capacitor $C_{70}$ and the other terminal $T_{26}$ is connected to the hold circuit 19B which includes a resistor $R_{71}$ and a capacitor $C_{71}$.

The operation of the signal sampling gate circuit 18 having the construction described above will now be described. The output of the ACC detector circuit 17 is coupled from the emitter of the emitter-follower transistor $Q_{59}$ to the input terminal $T_{20}$ of the signal sampling gate circuit 18 according to the burst gate pulse supplied to the terminal $T_{21}$. The head switch pulse supplied to the terminal $T_{22}$ is supplied in opposite phases to the transistors $Q_{68}$ and $Q_{69}$ with the input to the inverter 60. The bias voltages are set such that when the burst gate pulse of the negative polarity appears at the terminal $T_{21}$, the transistors $Q_{61}$ and $Q_{63}$ are turned off while the transistors $Q_{64}$ and $Q_{65}$ are turned on. At this time, the transistors $Q_{60}$ and $Q_{62}$ are held in the "on" state during the negative polarity burst gate pulse period. Since the head switch pulse is coupled from the terminal $T_{22}$ to the bases of the transistors $Q_{60}$ and $Q_{62}$, with the appearance of the positive polarity head switch pulse (corresponding to the A head at this time) the transistor $Q_{69}$ is turned on while the transistor $Q_{62}$ is turned off. That is, with the appearance of the head switch pulse of the positive polarity corresponding to the A head, the transistor $Q_{62}$ is turned off while the transistors $Q_{60}$, $Q_{64}$, $Q_{67}$ and $Q_{69}$ are turned on. At this time, the ACC detection signal corresponding to the A head, obtained from the terminal $T_{20}$, is coupled through the emitter of the transistor $Q_{60}$ to the hold circuit 19A. If the level of the ACC detection signal coupled to the hold circuit 19A at this time is low, the excess charge in the capacitor $C_{70}$ in the hold circuit 19A is discharged through the transistors $Q_{64}$ and $Q_{67}$ and current source $I_3$. While the head switch pulse is of the negative polarity (corresponding to the B head), the transistor $Q_{69}$ which contributes to the operation of sampling the ACC detector signal with respect to the A head is "off", and the ACC detection voltage sampled by the hold circuit 19A is held.

Similar operation to that described above with respect to the A head takes place when the ACC detection voltage with respect to the B head is held in the hold circuit 19B. The gating action for coupling the ACC detector signal to the hold circuit 19A or 19B is effected as one of the transistors $Q_{60}$ and $Q_{62}$ is turned on while the other is turned off according to the head switch pulse supplied to the terminal $T_{22}$.

The hold signal selectively held in the hold circuits 19A and 19B according to the head switch pulse signal, is coupled through the head selection switch circuit 20 which is controlled by the mode selection switch $SW_0$ to the DC amplifier 21 which DC amplifies the alternate ACC signals of the hold circuits 19A and 19B in synchronism to the head switch pulse signal. The head selection switch circuit 20 couples the output signals from the terminals $T_{27}$ and $T_{28}$ of the hold circuits 19A and 19B to the terminal $T_{29}$ in synchronism to the head switch pulse signal. In other words, the ACC action with respect to the color signal derived from the A head and the ACC action with respect to the color signal derived from the B head are provided in synchronism to the head switch pulse. To discriminate which one of the A and B heads the color signal is obtained from is necessary for providing the ACC action particularly in the playback mode. In the recording mode, the color signal with respect to which the ACC action is provided is not the signal obtained from the A or B head but the signal obtained from a television antenna or through a coaxial cable. The function of the head selection switch circuit 20 is therefore unnecessary at the time of the recording mode. The head selection switch circuit 20 is held inoperative in the recording mode by arranging such that the terminal $T_{29}$ of the head selection switch circuit 20 is connected to either terminal $T_{27}$ or $T_{28}$ while the high or low level is set for the head switch pulse input to the terminal $T_{22}$ at the time when the recording mode is set by the mode selection switch $SW_0$.

The ACC detection signal is coupled through the head selection switch circuit 20 to the terminal $T_{29}$ of the DC amplifier 21 for DC amplification. The DC amplifier 21 includes an emitter-follower transistor $Q_{80}$ having the base connected to the terminal $T_{29}$, a resistor $R_{80}$ connected to the emitter of the transistor $Q_{80}$, amplifying transistors $Q_{81}$ and $Q_{82}$, resistors $R_{81}$ and $R_{82}$, a diode $D_{80}$ and a bias circuit formed by transistors $Q_{83}$ and $Q_{84}$ and resistors $R_{83}$ to $R_{86}$. The base of the transistor $Q_{82}$ of the differential amplifier constituted by the transistors $Q_{81}$ and $Q_{82}$ is biased by a constant voltage $V_{Ref1}$ which is provided by the bias circuit mentioned. The ACC voltage appearing at the terminal $T_{29}$ is coupled through the transistor $Q_{80}$ to the base of the transistor $Q_{81}$ which forms the differential pair with the transistor $Q_{82}$. The differential pair of transistors $Q_{81}$ and $Q_{82}$ compares the aforementioned constant voltage $V_{Ref1}$ and the ACC voltage, and current according to the result of the voltage comparison flows through the diode $D_{80}$ and resistor $R_{82}$ to vary the anode voltage on the diode $D_{80}$. The impedance of the ACC amplifier 10 looked from the collector side of the transistor $Q_{30}$ is controlled according to the variation of the voltage on diode $D_{80}$ which corresponds to the ACC voltage. Through this control the gain of the ACC amplifier 10 is controlled. In this way, the ACC action is provided.

The ACC signal described above is also coupled to the DC amplifier 30 for generating a color killer signal from the emitter of the transistors $Q_{90}$ and $Q_{91}$, that is, it is also used as a control signal for the color killer operation. The DC amplifier 30 is constituted by a differential amplifier including transistors $Q_{90}$ and $Q_{91}$ and resistors $R_{90}$ and $R_{91}$. This differential amplifier is biased by the aforementioned bias circuit for the DC amplifier 21, and its bias voltage is set to be lower than a constant voltage $V_{Ref2}$. The differential pair of transistors $Q_{90}$ and $Q_{91}$ compares the constant voltage $V_{Ref2}$ with that of the DC amplifier 21. The voltage obtained from a resistor $R_{91}$ as the result of comparison of voltages is used as the color killer control voltage. At the time of the recording mode, this color killer signal is cut off in the mixer 16, which mixes the low frequency converted color signal at $f_1 = 688$ kHz and luminance signal, by operating a color killer signal switch (not shown) provided in the mixer 16.

The bias voltage $V_{Ref2}$ for the DC amplifier 30 for providing the color killer control signal is set to be lower than the bias voltage $V_{Ref1}$ for the DC amplifier for amplifying the ACC signal in order to delay the ACC action with respect to the color killer action so that the color image reproduction can be instantly switched over to the monochrome one without causing color flicker to appear on the reproduction.

It is to be emphasized that the ACC signal obtained from the signal sampling gate circuit 18 according to the invention can be utilized as the color killer control signal by processing through the DC amplifiers 21 and 30 in the above construction. Also, the ACC action can be delayed with respect to the color killer action. Further, a common bias circuit can be used for the DC amplifier 30 with respect to the color killer control signal and that 21 with respect to the ACC signal, while permitting the delay of the ACC action.

What we claim is:

1. A signal sampling gate circuit in a color video tape recording/reproducing device, having at least two reproducing heads which are alternately switched by a head switch pulse for processing a color signal, comprising:
   means (17) for generating a sample signal and processing said color signal;
   a sample signal input terminal (T20) to which said sample signal is supplied;
   a first hold circuit for holding the sample signal supplied to said sample signal input terminal;
   a first sample signal gate circuit for connecting said sample signal input terminal and said first hold circuit, in response to a sampling pulse when in a low impedance state, and disconnecting said sample signal input terminal from said first hold circuit in response to said sampling pulse when in a high impedance state;
   a second hold circuit for holding the sample signal supplied to said sample signal input terminal;
   a second sample signal gate circuit for connecting said sample signal input terminal and said second hold circuit, in response to the sampling pulse when in a low impedance state, and disconnecting said sample signal input terminal from said second hold circuit when in a high impedance state, said second signal gate circuit functioning in complementary fashion with respect to said first sample signal gate circuit;
   gate circuit driving means for selectively and complementarily driving said first and second sample signal gate circuits in response to the head switch pulse having a different period from that of said sampling rate; and
   sample signal gate circuit control means for controlling selectively said first and second sample signal gate circuits in one of the low and high impedance states in response to said head switch pulse;
   whereby said sample signal is held in said first and second hold circuits in response to the head switch pulse as a control signal for processing the color signal.

2. A signal sampling gate circuit according to claim 1, wherein said sample signal generating circuit is an ACC detector for producing an ACC detection signal from the color signal, and said sampling pulse is a burst gate pulse.

3. A signal sampling gate circuit according to claim 1, wherein said first sample signal gate circuit includes a first transistor which functions as an emitter follower amplifier, for said sample signal supplied to said sample signal input terminal in order to transmit said sample signal to said first hold circuit, a second transistor connected in series to said first transistor in order to form a discharge path for surplus charges of said first hold circuit, and a third transistor which forms a differential pair with said second transistor in order to construct a first differential switch that responds to said sampling pulse; said second sample signal gate includes a fourth transistor which functions as an emitter follower amplifier for said sample signal supplied to said sample signal input terminal in order to transmit said sample signal to said second hold circuit, a fifth transistor connected in series to said fourth transistor in order to form a discharge path for surplus charges of said second hold circuit, and a sixth transistor which forms a differential pair with said fifth transistor in order to construct a second differential switch that responds to said sampling pulse in complementary fashion with said first differential switch; said gate circuit driving means includes a third differential switch which drives said first and second sample signal gate circuits in response to said head switch pulse; and said sample signal gate circuit control means forces one of said first and second sample signal gate circuits to be in a high impedance state in response to said head switch pulse.

4. A signal sampling gate circuit according to claim 3, wherein the frequency of said sampling pulse is higher than the frequency of said control pulse.

5. A signal sampling gate circuit according to claim 2, wherein the sample signal obtained in the first and second hold circuits is used as a gain control signal for an ACC amplifier and controls the gain of the color signal coupled to said ACC detector; said sample signal also being used as a color killer signal.

6. A signal sampling gate circuit according to claim 2, wherein the sample signal obtained in the first and second hold circuits is used as a color killer control signal for inhibiting color signal output with respect to a mixer circuit for providing an output signal obtained as a result of mixing luminance signal and color signal.

7. A signal sampling gate circuit according to claim 2, wherein the sample signal obtained in the first and second hold circuits is used as a gain control signal for ACC amplifier and controls the gain of the color signal coupled to said ACC detector after its use as a color killer control signal.

8. A signal sampling gate circuit according to claim 2, which further comprises a color amplifier for amplifying the color signal to be detected and for providing said ACC detection signal coupled to said sample signal input terminal, the gain of said color amplifier controlled according to the sample signal supplied from said first and second hold circuits being equal to a recording mode and a reproduction mode.

* * * * *